Figure 1:
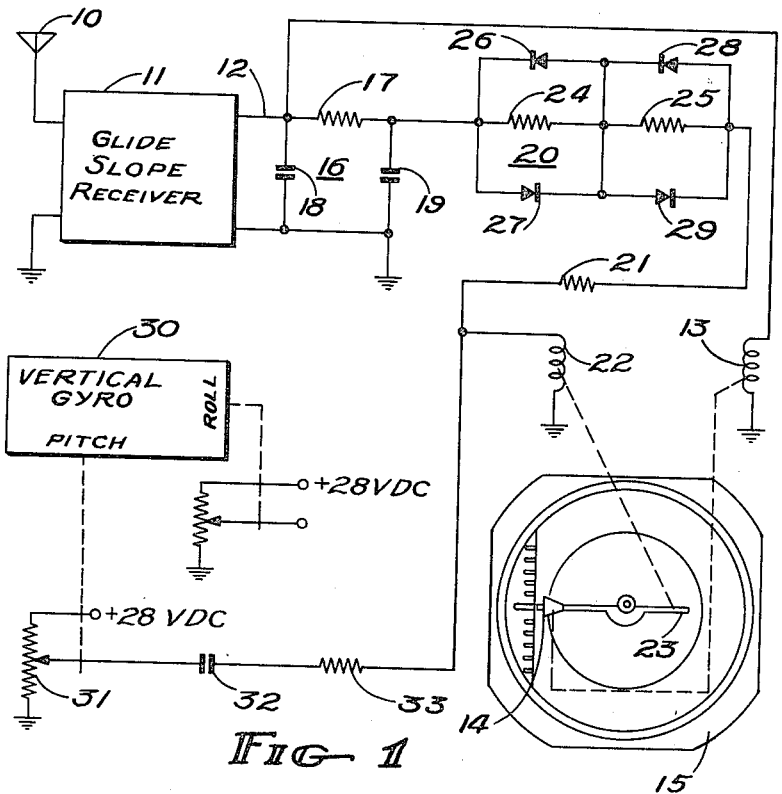

May 31, 1960

D. C. SATHER 2,939,137

NONLINEAR GLIDE-SLOPE TRANSFER NETWORK
AND AIRCRAFT CONTROL SYSTEM
Filed July 8, 1957

INVENTOR.
DELAINE C. SATHER
BY Marvin Moody
ATTORNEY

United States Patent Office 2,939,137
Patented May 31, 1960

2,939,137

NONLINEAR GLIDE-SLOPE TRANSFER NETWORK AND AIRCRAFT CONTROL SYSTEM

Delaine C. Sather, Cedar Rapids, Iowa, assignor to Collins Radio Company, Cedar Rapids, Iowa, a corporation of Iowa Filed July 8, 1957, Ser. No. 670,486

5 Claims. (Cl. 343—108)

This invention relates to vertical guidance systems for aircraft and particularly it pertains to circuits for glide-slope deviation indicators in radio-guided landing systems. The circuits of this invention are applicable to aircraft landing systems and particularly to the well-known glide-slope system.

In the glide-slope system, two radio signals which are modulated by two different frequencies, for example, 90 cycles per second and 150 cycles per second, are radiated from a point adjacent to a runway of an aircraft landing field. The radiated electromagnetic field consists in general of two narrow conical beams, one modulated at 90 cycles per second and the other modulated at 150 cycles per second, directed one slightly above the other. The glide-slope path that is to be followed by an approaching aircraft is defined by that locus in which the field intensity of the one signal is equal to that of the other.

The receiver within the approaching aircraft derives from the radiated field at differential voltage for application to a glide-slope deviation indicator. A zero reading of the meter indicates that the aircraft is on the glide path. In response to a departure above or below the path, the differential voltage that is supplied by the receiver to the indicator has a polarity dependent upon the direction of the departure and a magnitude dependent upon the extent of the departure. The vertex of the radiated conical field usually being on the runway, the magnitude of the indication is a function of the angle between the glide-slope path and the radius vector that extends from the glide-slope antenna to the approaching aircraft. According to well-known principles, as the aircraft approaches the runway, equal departures represent increasingly greater angles and accordingly increasingly greater voltages for the glide-slope deviation indicator. The greater sensitivity of the indicator near touchdown causes the indicator to fluctuate an undesirable amount.

In certain receiving systems the output of the glide-slope receiver, in addition to being applied directly to the glide-slope deviation indicator, is applied in combination with pitch signal to a steering indicator. This indicator for showing vertical departure from a glide-slope path is referred to hereinafter as a horizontal steering bar which is descriptive of the indicator as it appears on the usual aircraft display instrument. During approach to the runway, the pilot flies the aircraft such that the glide-slope deviation indicator and the horizontal steering bar simultaneously approach zero reading which is the on-course reading. At the same time, other systems, which are not described herein, provide the pilot with other necessary instrument readings; for example, the localizer system provides readings for indicating correct horizontal position.

In present glide-slope systems for vertical guidance, the pilot often has difficulty in interpreting the reading of the horizontal steering bar to provide smooth, accurate guidance on the glide-slope path. The horizontal steering bar tends to fluctuate wildly especially near touchdown and it does not indicate in a positive manner correction required because of wind or pitch bias error.

Fluctuations of the horizontal steering bar are caused by increasing sensitivity of the glide-slope system as touchdown is approached and by radio beam noise. As indicated previously, the magnitude of the deviation voltage derived from the glide-slope receiver varies inversely with the distance of the aircraft from the transmitting antennas. As the runway is approached, the position of the horizontal steering bar varies considerably in response to relatively small departures from the glide-slope beam. Radio beam noise is encountered because the glide path, which is a locus of equal signal intensities, is not on an exact plane. As the aircraft flies in a straight line along the glide path, slight variations of field intensity, which are a source of noise, are encountered to cause the steering bar to fluctuate. Therefore, the true reading of the bar is not readily apparent to the pilot of the approaching aircraft. Furthermore, wind or pitch bias error tends to change the reading of the horizontal steering bar so that the pilot must compensate by flying with the bar slightly off zero indication. Proper correction of the pitch reading requires careful flying by an experienced pilot. Accordingly, in order that the pilot can rely upon a steady reading at zero as being the correct one for following a glide-slope path, the present invention embodies a nonlinear transfer network connected between a glide-slope receiver and an indicator and also a high-pass filter connected between a source of vertical reference voltage and the same indicator for stabilizing the reading thereof.

An object of the present invention is to provide aircraft guidance systems wherein voltages derived in response to the departure of aircraft from a radio beam path are reduced when the extent of the departure is small. Another object is to provide, in combination with voltage from the aircraft guidance system, pitch voltage from which steady state error has been removed.

Figure 2:
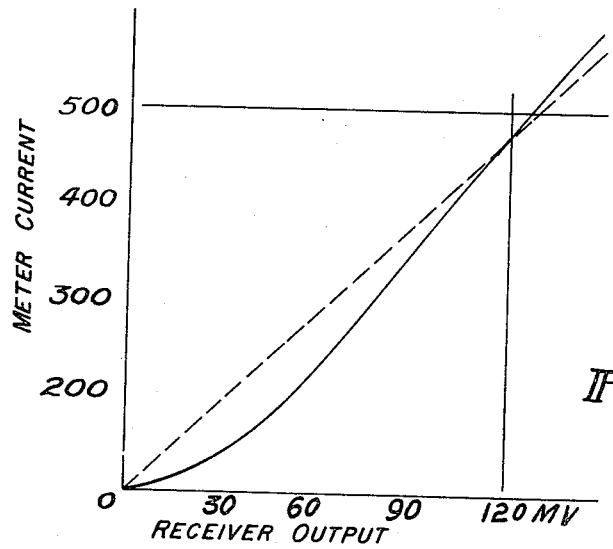

The following description and the appended claims may be more readily understood by reference to the accompanying drawings in which:

Figure 1 is a schematic diagram showing the circuits of this invention for stabilizing a glide-slope steering indicator; and Figure 2 is a graph showing the effect of the indicator circuits in decreasing readings that are the result of small departures of an aircraft from a glide-slope path.

Briefly, the circuit shown in Figure 1 comprises a glide-slope receiver which, in addition to being connected in the usual manner directly to the winding of a glide-slope deviation indicator, is connected through a nonlinear transfer network to the winding of a horizontal steering bar. A vertical gyro is connected through highpass filter circuits also to the winding of the same horizontal steering bar. When the output of the receiver is sufficient so that the indicator operates at nearly a full-range reading, the sensitivity of the indicator in response to a change in output of the glide-slope receiver is nearly normal. However, when the output of the receiver is low such that the indicator is operated at some point substantially less than full scale reading, the reading is decreased by the nonlinear transfer network so that it is still smaller. The high-pass filter for coupling the indicator to the vertical gyro eliminates steady state error that may result from either cross-wind or pitch bias setting error.

More particularly, antenna 10 for deriving a signal from the radiated glide-slope field is connected to the input of a conventional glide-slope receiver 11. The output circuit 12 of the receiver is connected to winding 13 that actuates glide-slope deviation pointer 14 of aircraft display instrument 15. Pointer 14 operates in the usual manner for indicating departure from the glide-slope path, The output circuit 12 of the glide-slope receiver is also connected through low-pass filter 16, nonlinear transfer network 20, and isolating resistor 21 to winding 22. The low-pass filter 16 comprises series resistor 17 and shunt capacitors 18 and 19 and reduces the effect of transient signals and radio beam noise. Winding 22 is effective in actuating horizontal steering bar 23 that is a part of the aircraft display instrument 15. The nonlinear transfer network 20 includes two resistors 24 and 25 connected in series. In parallel with resistor 24 is connected mutually reversed diodes 26 and 27, and in parallel with resistor 25 is connected mutually reversed diodes 28 and 29. Although a two-section network is shown, the network may consist of only one section having one resistor and a pair of diodes or may consist of any other number of sections required for obtaining the desired nonlinear characteristic. The nonlinear characteristic is in accordance with the well-known principle that for small currents the resistance of diodes varies inversely with the amount of current flowing therethrough. When the departure of an aircraft from a glide-slope path is small so that the voltage supplied from the discriminator circuits of glide-slope receiver 11 is also small, the impedance of nonlinear transfer network 20 is determined to a large extent by the values of series resistors 24 and 25. When the departure of the aircraft from the path is somewhat greater so that current flow through transfer network 20 increases, the resistance of series diodes 26 and 28 for one direction of current flow and of diodes 27 and 29 for the opposite direction of current flow decreases until for wide departures from the glide-slope path the current through network 20 flows almost entirely through these diode circuits which are in parallel with resistors 24 and 25.

The effect of the nonlinear network on the reading of the horizontal steering bar is shown in the graph of Figure 2. To obtain the response shown by the solid line of the graph, the value of resistors 24 and 25 have been selected as 2,000 and 10,000 ohms, respectively. The dashed line of the graph shows linear response that has usually been obtained in previous circuits in which 120 millivolts of receiver output provides a meter current for the horizontal steering bar of somewhat less than 500 microamperes corresponding to a meter reading of 4 dots. When a nonlinear transfer network is used, the sensitivity of the circuit is adjusted so that the receiver output for obtaining a reading of four dots on the horizontal steering bar is the same for nonlinear response as it is for the usual linear response. However, when a nonlinear network is being used, the reading at mid-scale is substantially lower than it is for a linear system and remains substantially lower until the reading becomes nearly zero.

Usually, in order to obtain smooth steering control, a rate signal which is generally derived from a vertical reference, such as vertical gyro 30 of Figure 1, is combined with the output of the glide-slope receiver for application to the winding of the horizontal steering bar. In the present invention, the rate signal circuits include a high-pass filter. The mechanical pitch output of vertical gyro 30 is connected to the arm of potentiometer 31, which has its outside terminals connected across a source of 28 volts D.C. Variable voltage derived in response to motion of the arm of potentiometer 31 is applied to winding 22 of horizontal steering bar 23 through a high-pass filter that consists of serially connected capacitor 32 and resistor 33. When the approaching aircraft is properly headed for entering the glide-slope path, the voltage that is applied to winding 22 from the pitch reference has a polarity that is in opposition to that of the voltage which is applied from the glide-slope receiver to the same winding. The values of capacitor 32 and resistor 33 in the high-pass filter have been selected such that the time constant is approximately twelve seconds. Different flight situations may require different time constants.

The following example illustrates the operation of the glide-slope system described herein. If an aircraft is ten miles from touchdown at an altitude of 2,800 feet while the glide-slope path directly below the craft is at an altitude of 2,300 feet, glide-slope receiver 11 develops a voltage that has a polarity for indicating that the aircraft is above the glide-slope path and that has sufficient magnitude for operating both the glide-slope deviation indicator and the horizontal steering bar to a maximum reading of five dots. As the pilot changes the altitude of the aircraft to fly downward, voltage from pitch reference potentiometer 31 is applied to the high-pass filter to winding 22 of the horizontal steering bar. This voltage is in opposition to the voltage that is applied to the winding from the output of the glide-slope receiver. The combination of the two voltages provides zero reading of the horizontal steering bar when the heading of the aircraft is proper for entering the glide-slope path asymptotically or when the aircraft is actually flying on the glide-slope path. As the glide-slope path is approached, the reading of the glide-slope indicator also becomes zero; that is, both the horizontal steering bar and the glide-slope indicator indicate zero when the aircraft is properly following the glide-slope path.

If the aircraft is following the glide-slope path, slight departures therefrom or slight variations in glide-slope beam pattern are prevented from causing large annoying fluctuations of the horizontal steering bar by the nonlinear transfer network 20. This feature of having a smooth indicator reading near zero is especially effective and helpful as touchdown is approached, because, as previously described, small departures produce large voltage variations in the output of the glide-slope receiver.

The only pitch attitude of the aircraft that should be effective in developing voltage for application from the vertical reference to the horizontal steering bar should be that which indicates that the attitude of the aircraft has departed from that which is normal for following the glide-slope path. The high-pass filter prevents steady voltage that may be developed by the pitch reference from affecting the horizontal steering bar. For example, voltage derived during the constant angle of attack while the aircraft is flying the glide-slope beam is not present to cause deviation of the bar from the zero reading. Therefore, pitch error caused by wind of undetermined velocity is ineffective in causing an incorrect positioning of the horizontal steering bar. Should the speed of the aircraft be changed during approach to the landing strip and thereby acquire a change in pitch, the position of the horizontal steering bar will be changed only temporarily by this change of pitch.

Although the present invention has been described with reference to a visual indicator for use in manually piloting an aircraft, it is to be understood that this system is particularly applicable to an automatic pilot system. When the circuits that are shown connected to winding 22 of the horizontal steering bar are applied to the input of an autopilot system for operating elevators, the elevators are moved noticeably smaller amounts for maintaining the aircraft accurately on the glide-slope path.

In comparison with previous glide-slope systems, the glide-slope system of this invention provides greater stability of a horizontal steering bar or, when an automatic pilot is used, provides noticeably less changes in the positioning of the elevators of the aircraft. This increased stability is particularly noticeable as the aircraft nears touchdown. Also, the beam noise has such little effect on the horizontal steering bar that the effect of the noise is comparatively unnoticeable. A particular valuable feature is the automatic correction of pitch trim by using a high-pass filter in the circuit that connects the vertical reference to either the horizontal steering bar or to the input circuits of an automatic pilot. This automatic correction of pitch trim makes it possible for a pilot to control the aircraft for obtaining zero reading on both the glide-slope deviation indicator and the horizontal steering bar. The display of the glide-slope deviation indicators is, therefore, consistent with that used in displaying functions of altitude or Mach number and flare-out.

Although this invention has been described with respect to a particular embodiment thereof, it is not to be so limited as changes and modifications may be made therein which are within the full and intended scope of the invention as defined by the appended claims.

What is claimed is:

1. In a landing system for an aircraft, a nonlinear transfer network and a high-pass filter for stabilizing the output of said system, a radio receiver for developing a voltage that varies directly with the extent of departure of said aircraft from a predetermined path defined by radiant energy, vertical reference means for developing a voltage that varies directly with departure of said aircraft from a predetermined attitude with reference to a vertical direction, positioning means responsive to application of voltage thereto to aid in piloting said aircraft, said receiver being connected through said nonlinear transfer network to said positioning means and also said vertical reference means being connected through said high-pass filter to said positioning means for applying voltage thereto, said nonlinear transfer network having impedance that varies inversely with the application of voltage thereto from said receiver, and said high-pass filter having a predetermined time constant for transferring a steady state voltage from said vertical reference means to said positioning means for only a predetermined time after the development of said steady state voltage by said vertical reference means.

2. In a landing system having a radio receiver and positioning means, an electrical nonlinear transfer network interposed between said receiver and said positioning means, said nonlinear network comprising a resistance circuit and a nonlinear diode rectifier circuit connected in parallel, said receiver having an output circuit for applying voltage to said network, said voltage varying directly with the distance of departure of an aircraft from a predetermined path defined by radiant energy, said nonlinear network operating to transfer reduced voltage to said positioning means in response to the application of voltage below a predetermined level to said network and to transfer substantially unaltered voltage to said positioning means in response to application of voltage higher than said predetermined level, and said positioning means being responsive to application of voltage thereto to aid in piloting said aircraft.

3. In a landing system for aircraft, a high-pass filter for eliminating transfer of steady state voltage, positioning means responsive to application of voltage thereto to aid in piloting said aircraft, vertical reference means for developing voltage indicative of the attitude of the aircraft with respect to a vertical direction, said high-pass filter including a capacitor and a resistor connected in series between said vertical reference means and said positioning means, said high-pass filter being effective to limit the length of time over which said positioning means is responsive to application of a steady state voltage from said vertical reference means, a glide-slope receiver connected to said positioning means, and said receiver being responsive to departures from a glide-slope beam for developing voltage that is also applied to said positioning means.

4. In a radio approach system for aircraft including, a glide-slope receiver having an input circuit and an output circuit, said input circuit for receiving signal from a glide-slope beam, said receiver responding to departure of said aircraft from the path of the glide-slope beam for developing in said output circuit a voltage proportional to the extent of departure of the aircraft from said path, an indicator having an on-course position, said indicator deviating from said on-course position in direct proportion to the amplitude of voltage applied thereto; a nonlinear electrical network connecting said receiver output circuit to said indicator, and said network in response to application of voltage below a predetermined level having an impedance varying inversely with said applied voltage, whereby readings on said indicator are reduced for departures that are less than that for developing said predetermined voltage level.

5. In a radio approach system for aircraft, a nonlinear network in combination with a glide-slope receiver and an indicator, said receiver having an input circuit and an output circuit, said input circuit for receiving signal for a glide-slope beam, said receiver responding to departure of said aircraft from the path of said glide-slope beam for developing a voltage proportional to the extent of the departure of said aircraft from said path, said nonlinear network connecting said output circuit to said indicator, said nonlinear network including a resistor and two mutually reversed diode rectifiers connected in parallel with each other and in series with said indicator, said filter being responsive to application of voltage lower than a predetermined applied voltage for reducing voltage applied from said filter to said indicator, whereby changes in reading of said indicator are decreased for voltage changes developed by said receiver in response to small deviation of said aircraft from said path.

References Cited in the file of this patent

UNITED STATES PATENTS

| | | |
|---|---|---|
| 2,439,044 | Ferrill | Apr. 6, 1948 |
| 2,498,730 | Williams | Feb. 28, 1950 |
| 2,784,401 | Dove | Mar. 5, 1957 |